April 16, 1935.  W. DALTON  1,998,310
FABRICATED STRUCTURE
Filed April 29, 1933
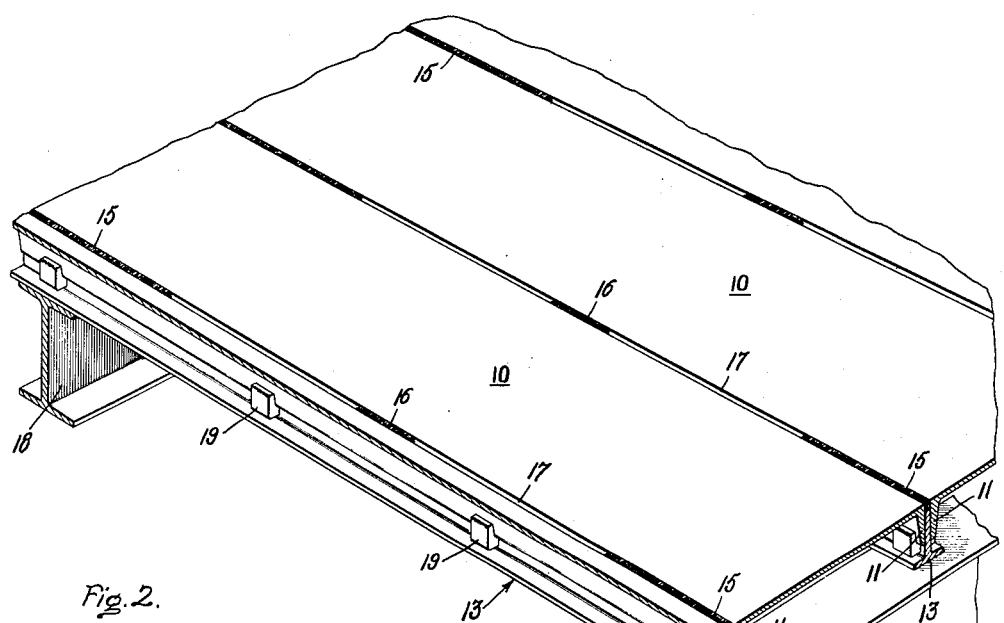
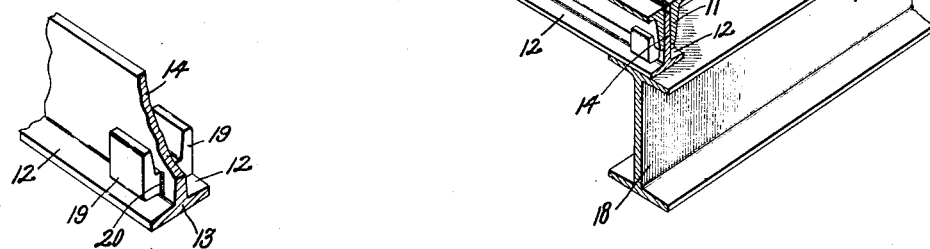
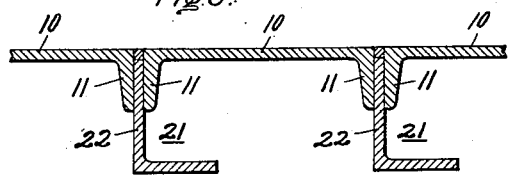
Inventor:
William Dalton,
by Charles E. Mullan
His Attorney.

Patented Apr. 16, 1935

1,998,310

UNITED STATES PATENT OFFICE 1,998,310

FABRICATED STRUCTURE

William Dalton, Schenectady, N. Y., assignor to General Electric Company, a corporation of New York Application April 29, 1933, Serial No. 668,575

4 Claims. (Cl. 189—34)

My invention relates to fabricated structures which are particularly suited for roof and floor slabs in building construction.

It is an object of my invention to provide a load supporting structure in which the tension members consist of members having angularly disposed legs and the compression members consist of channels the unflanged surfaces of which form the load supporting surface of the structure.

It is a further object of my invention to provide an improved method of assembling leg members and channel members into a fabricated structure of the character described above.

Further objects of my invention will become apparent from a consideration of the construction illustrated in the accompanying drawing, Fig. 1 of which illustrates one embodiment thereof as applied to floor construction, Fig. 2 of which illustrates a modification thereof, and Fig. 3 of which illustrates another embodiment.

The fabricated structure illustrated in Fig. 1 comprises a plurality of channel members 10 arranged alongside of one another with their flanges 11 extending toward and at right angles to the flanges 12 of T-bars 13 the stems 14 of which are inserted between the flanges of adjacent channels and attached thereto by welds 15 and 16. Channel members and T-bars of the usual construction have been illustrated in the drawing. It is to be noted that the inside surfaces of the flanges of the channel members slope toward one another. The unflanged surfaces of the channels 10 form the load supporting surface of the floor structure and the T-bars 13 form the base of the floor. Prior to welding, the channels and T-bars are preferably positioned relatively to one another to form a groove 17 between the channels which are then united to one another and the T-bars inserted therebetween by weld metal deposited in this groove. It is not necessary to weld the members together along their entire length since sufficient strength can be obtained by welding at 15 over the supports 18 upon which the floor rests and at the centers 16 of the floor spans determined by these points of support. The length of the welds 15 will be determined by the shear strains developed in the structure when it is used for its intended purpose. The welds 16 are primarily employed for tying the parts together.

Prior to the welding operation it is desirable to provide some means for holding the parts in adjusted relationship relative to one another. One convenient means for accomplishing this result is through the use of clamps 19 attached to the T-bars 13. The clamp may be of any suitable type, but I prefer to use one having a surface adapted to engage the sloping sides of the channel flanges so that the channels by their own weight will securely wedge themselves against the stems of the T-bars when their flanges are placed in the clamp. The clamps may be bolted to the T-bars 13, but I prefer to attach them thereto by a welding operation. In Fig. 1 the clamps have been attached to the stems of the T-bars by a resistance welding operation, which is preferably performed prior to the location of the T-bars in the construction of which they are to form a part. The clamps 19 may be attached to the stems 14 of the T-bars by arc welds 20, as illustrated in Fig. 2, in which case the operation may readily be performed in the shop or in the field.

A structure fabricated in accordance with my invention is not necessarily limited to the employment of T-bars since other members having angularly disposed legs may be used to perform the same functions as the T-bars in the arrangement described above. For example, as shown in Fig. 3, angles may be used. When angles are used in place of T-bars one leg 22 of the angles 21 is inserted between the flanges 11 of the channels 10 in the same manner that the stems or legs 14 of T-bars 13 are inserted between the flanges of channels 10 in the construction above described in connection with Fig. 1. It is also apparent that the legs of the T-bars and angles need not be inserted between the flanges of the channels since the same effects may be obtained if the edges of the leg members are attached to the tips of the channel flanges.

It will be noted that a floor of my construction may be made of standard rolled sections which have been used for many years in building construction, and which are readily obtainable in many sizes and weights. Furthermore, by employing the particular assembly characteristic of my invention a maximum strength and minimum deflection per pound of material is obtained as compared with other types of constructions heretofore proposed. The fabricated structure has a smooth surface to which linoleum, wooden blocks, or other surfacing materials may be added. Furthermore, if the surface of the channel is suitably roughened, the structure may be used without a covering in which case it would be desirable to fill with asphalt or similar material the portions of the groove 17 not filled with weld metal. The parts are assembled in a position which readily adapts them for both hand and automatic welding. If the parts are to be assembled by metallic arc welding, they are preferably arranged as above described and as illustrated in the drawing. If, however, they are to be united by carbon arc welding or similar processes of welding making use of non-consuming electrodes, the parts may be advantageously assembled in a manner to eliminate the groove 17 in which case a union of the parts may be obtained by fusing the parts together without the addition of weld metal. I prefer, however, to secure the union of the parts through the addition of weld metal as above described. The T-bars may be rolled with channel supporting projections thereon in which case it will not be necessary to apply clamps 19 as described above in connection with the particular embodiments illustrated in the drawing. Although my invention is particularly suited for roof and floor construction, its use is not limited thereto.

While I have shown and described two embodiments of my invention, it is to be understood that other embodiments thereof may be made without departing from my invention.

What I claim as new and desire to secure by Letters Patent of the United States, is:

1. The method of assembling channels and members having angularly disposed legs which comprises providing the opposite sides of one leg of each of said leg members with projections adapted to support said channels by engaging their flanges, supporting said leg members with their projection supporting legs turned upwardly, supporting channels on said leg members with their flanges on said projections and uniting said channels and said leg members into an integral structure by welding them together on the unflanged sides of said channels.

2. The method of assembling channels and members having angularly disposed legs which comprises providing the opposite sides of one leg of each leg member with clamps having surfaces adapted to wedge against said leg members a channel flange supported therein, supporting said leg members with their clamp supporting legs turned upwardly, supporting channels on said leg members with their flanges in said clamps and uniting said channels and said leg members into an integral structure by welding them together on the unflanged sides of said channels.

3. A fabricated structure comprising channel members and members having angularly disposed legs the opposite sides of one leg of each of said leg members being provided with projections adapted to support said channels by engaging their flanges when the projection supporting legs of said leg members are turned upwardly and said channels are supported thereon with their flanges in engagement with said projections, the load supporting surface of said fabricated structure being formed by the unflanged surfaces of said channels arranged alongside of one another and separated from one another by the projection supporting legs of said leg members to which said channels are integrally united by weld metal on the unflanged sides of said channels.

4. A fabricated structure comprising channel members having flanges whose inside surfaces slope toward one another and members having angularly disposed legs to the opposite sides of one leg of each of which leg members are attached clamps whose inside surfaces are adapted to wedge said channels against said leg members when the clamp supporting legs of said leg members are turned upwardly and said channels are supported thereon with their flanges in said clamps, the load supporting surface of said fabricated structure being formed by the unflanged surface of said channels arranged alongside of one another and separated from one another by the clamp supporting legs of said leg members to which said channels are integrally united by weld metal on the unflanged sides of said channels.

WILLIAM DALTON.